US007096367B2

(12) United States Patent
Garg et al.

(10) Patent No.: US 7,096,367 B2
(45) Date of Patent: Aug. 22, 2006

(54) SYSTEM AND METHODS FOR CACHING IN CONNECTION WITH AUTHORIZATION IN A COMPUTER SYSTEM

(75) Inventors: Praerit Garg, Kirkland, WA (US); Robert P. Reichel, Sammamish, WA (US); Richard B. Ward, Redmond, WA (US); Kedarnath A. Dubhashi, Bellevue, WA (US); Jeffrey B. Hamblin, North Bend, WA (US); Anne C. Hopkins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 761 days.

(21) Appl. No.: 09/849,099

(22) Filed: May 4, 2001

(65) Prior Publication Data

US 2002/0166052 A1 Nov. 7, 2002

(51) Int. Cl.
*H04K 1/00* (2006.01)
*H04L 9/00* (2006.01)
(52) U.S. Cl. ............... 713/182; 713/165; 713/167; 726/2; 707/9; 709/217
(58) Field of Classification Search ........ 713/165–167, 713/182; 707/9; 726/2; 709/217
See application file for complete search history.

(56) References Cited

U.S. PATENT DOCUMENTS 5,469,556 A * 11/1995 Clifton ................... 711/163
2001/0021926 A1* 9/2001 Schneck et al. ........... 705/54

OTHER PUBLICATIONS

1 An extended capability architecture to enforce dynamic access control policies, I-Lung Kao; Chow, R. ; Computer Security Appli-cations Conference, 1996., 12th Annual , Dec. 9-13, 1996 , pp.: 148-157.*

Kassab, L.L. et al., "Towards formalizing the Java security architecture of JDK 1.2," *Computer Security—ESORICS 98. 5th European Symposium on Research in Computer Security*, published by Springer-Verlag, Berlin, Germany, Quisquater, J-J. et al. (eds.), Louvain-la-Neuve, Belgium, Sep. 16-18, 1998, 191-207.

Sandhu, R.S. et al., "Some owner based schemes with dynamic groups in the schematic protection model," *Proceedings of the 1986 IEEE Symposium on Security and Privacy*, published by IEEE Computer Soc. Press, Oakland, CA, Apr. 7-9, 1986, 61-70.

(Continued)

*Primary Examiner*—Gilberto Barron, Jr.
*Assistant Examiner*—Samson Lemma
(74) *Attorney, Agent, or Firm*—Woodcock Washburn LLP

(57) ABSTRACT

An authorization handle is supported for each access policy determination that is likely to be repeated. In particular, an authorization handle may be assigned to access check results associated with the same discretionary access control list and the same client context. This likelihood may be determined based upon pre-set criteria for the application or service, based on usage history and the like. Once an access policy determination is assigned an authorization handle, the static maximum allowed access is cached for that policy determination. From access check to access check, the set of permissions desired by the client may change, and dynamic factors that might affect the overall privilege grant may also change; however, generally there is still a set of policies that is unaffected by the changes and common across access requests. The cached static maximum allowed access data is thus used to provide efficient operations for the evaluation of common policy sets. In systems having access policy evaluations that are repeated, authorization policy evaluations are more efficient, computer resources are free for other tasks, and performance improvements are observed.

20 Claims, 6 Drawing Sheets

OTHER PUBLICATIONS

Bai, Y. et al., "A language for specifying sequences of authorization transformations and its applications," *Information and Communications Security. First International Conference, ICIS '97,* published by Springer-Verlag, Berlin, Germany, Beijing, China, Nov. 11-14, 1997, 39-49.

Netegrity, "SiteMinder Delivers Industry-Leading Performance, Scalability, and Reliability," Netegrity White Paper, Dec., 1999, 5 pages.

* cited by examiner

SYSTEM AND METHODS FOR CACHING IN CONNECTION WITH AUTHORIZATION IN A COMPUTER SYSTEM

CROSS REFERENCE TO RELATED APPLICATION

This application relates to commonly assigned copending U.S. patent application Ser. No. 09/849,093, also entitled "System and Methods for Providing Dynamic Authorization in a Computer System," filed on the same day as the present application, the entirety of which is hereby incorporated by reference.

FIELD OF THE INVENTION

This invention relates generally to the provision of authorization policies in a computer system, and more particularly to methods for caching and optimizing the performance of authorization to applications, objects and/or services in a computer system.

BACKGROUND OF THE INVENTION

It is often the case with access rights or authorization determinations that certain aspects of the determination are likely to be repeated. When nothing changes from determination to determination, and two determinations are made exactly the same, resources are wasted because result(s) of the first determination could be re-used. This is especially true when access decisions are computationally expensive. Thus, it would be desirable to in some fashion re-use computations that have already been made, so that static access policy evaluations are not repeated, thereby making a system more efficient, freeing up computer resources for other tasks, and generally increasing performance.

It would also be advantageous to re-use decision-making in connection with dynamic data and policy evaluation algorithms. For example, it is often desirable to grant access privileges to applications, services, and various objects based upon dynamic factors i.e., based upon factors that may change over time. Within an organization, for example, a user context might change if a user is promoted or otherwise given new or different privileges. Similarly, the client context can change too if hardware and/or software on the machine is altered, which could happen, for instance, if an administrator or other machine in an associated computer system changes a characteristic of the client. Thus, it is possible to specify access policy and data based upon dynamic factors, such as client operation parameter values, client attributes for use in connection with an access policy, wherein the access policy may also be specified according to dynamic factors. Relative to the counterparts of systems where authorization policies are determined in relation to dynamic factors i.e., systems using static data and static policy, dynamic authorization systems have much greater flexibility in implementation. However, dynamic authorization systems make it more difficult to cache and reuse the results of an access check that may involve both static and dynamic policy evaluations, since the dynamic policy may need to be reevaluated for every access check.

For example, a system and methods for providing dynamic authorization in a computer system via standard programming objects are disclosed in commonly assigned copending U.S. patent application Ser. No. 09/849,093, filed May 4, 2001. In one embodiment, the system of U.S. patent application Ser. No. 09/849,093 supplements the APIs and data structures used for statically determined authorization policies. According to a typical access check procedure, an application registers itself for use of the dynamic group and dynamic access check routines that will supplement the regular access check APIs and data structures. The regular access check APIs and data structures are correspondingly altered to accommodate and utilize the dynamic functionality of the dynamic routines. Upon a request from a user or a machine, the client context is determined based upon static and dynamic data i.e., the client context may be computed in relation to dynamic factors. For instance, the groups to which the requestor belongs may be a dynamic factor, and may be determinative as to whether the requestor has access vis-à-vis a dynamic or static authorization policy. According to a routine that determines the requestor's group affiliation according to static factors, the client context is then updated with dynamically computed groups according to the dynamic group routine. If there is dynamic authorization policy, it can be stored in a specialized dynamic Access Control Entry (ACE) structure that has an identifier indicating its dynamic nature. By way of the access check APIs used for static ACEs, augmented by dynamic functionality, if a match is made between information contained in the client context and a dynamic ACE, a dynamic access check routine tailored to the application is called whereby the authorization policy is determined in relation to dynamic data. This information is returned to supplement static access determination results and permission for the requested access may then be denied or granted in accordance with the results.

As mentioned above, however, performance improvement is possible when the same policy computation is repeated. Given that many access checks involve the same user accessing multiple resources protected by the same authorization policy, it is noted that a redundant policy computation may be performed for these access checks. Consequently, it would be desirable to cache a determination as to the static maximum allowed access that may be granted for a given access inquiry, whereby assuming a particular access meets some or all of the privileges contained in the static maximum allowed access, an actual and full-blown dynamic determination need not be performed, thus resulting in substantial savings of computer resources.

SUMMARY OF THE INVENTION

The invention supports assigning an authorization handle to each access policy determination that is likely to be repeated. In particular, an authorization handle may be assigned to access check results associated with the same discretionary access control list and the same client context. This likelihood may be determined based upon pre-set criteria for the application or service, based on usage history and the like. Once an access policy determination is assigned an authorization handle, the invention caches the static maximum allowed access for that policy determination. From access check to access check, the set of permissions desired by the client may change, and dynamic factors that might affect the overall privilege grant may also change; however, even under these circumstances, generally there is still a set of policies that will be unaffected by the changes and common across access requests. In accordance with the invention, the cached static maximum allowed access data is thus used to provide efficient operations for the evaluation of the common set of policies.

Thus, for a system having access policy evaluations that are repeated, the invention makes the system more efficient, frees up computer resources for other tasks, and generally increases performance.

Other features of the present invention are described below.

BRIEF DESCRIPTION OF THE DRAWINGS

The system and methods for caching in connection with authorization in a computer system are further described with reference to the accompanying drawings in which.

DETAILED DESCRIPTION OF THE PREFERRED EMBODIMENTS

Overview

In consideration of the above-described need for more efficient and less resource intensive access policy determinations, the invention supports an authorization handle to each type of dynamic access policy determination that is likely to be repeated. For example, an authorization handle may be assigned to access checks including the same Discretionary Access Control List (DACL) and the same client context. This likelihood may be determined based upon pre-set criteria for the application or service, based on usage history and the like. Once a repetitive access policy determination is assigned an authorization handle, the invention caches the static maximum allowed access for that policy determination. From access check to access check, the set of permissions desired by the client may change, and dynamic factors that might affect the overall privilege grant may also change; however, even under these circumstances, generally there is still a set of policies that will be unaffected by the changes and common to the access request. A static maximum allowed access data structure is hence determined that includes information representative of a set of policies that is reduced to static form that is common to a class of access requests. In accordance with the invention, the cached static maximum allowed access data is used to provide efficient operations for the evaluation of the common set of policies.

Once cached, if no dynamic access policy is defined in the DACL, then access decisions are instantaneous because the static maximum allowed access contains all of the permissions that may be granted to the requestor. If some dynamic access policy remains in the DACL, then access decisions are still much faster than without the static maximum allowed access because only determinative dynamic factors need be evaluated i.e., the static policy need not be reevaluated in most cases. Also, if the set of permissions requested is contained entirely within the static maximum allowed access data, then no additional computations are required. Thus, for access policy evaluations that are repeated, the invention makes systems that utilize authorization policies much more efficient, frees up computer resources for other tasks, and generally increases performance of the system.

Exemplary Computer and Network Environments

Figure 1:
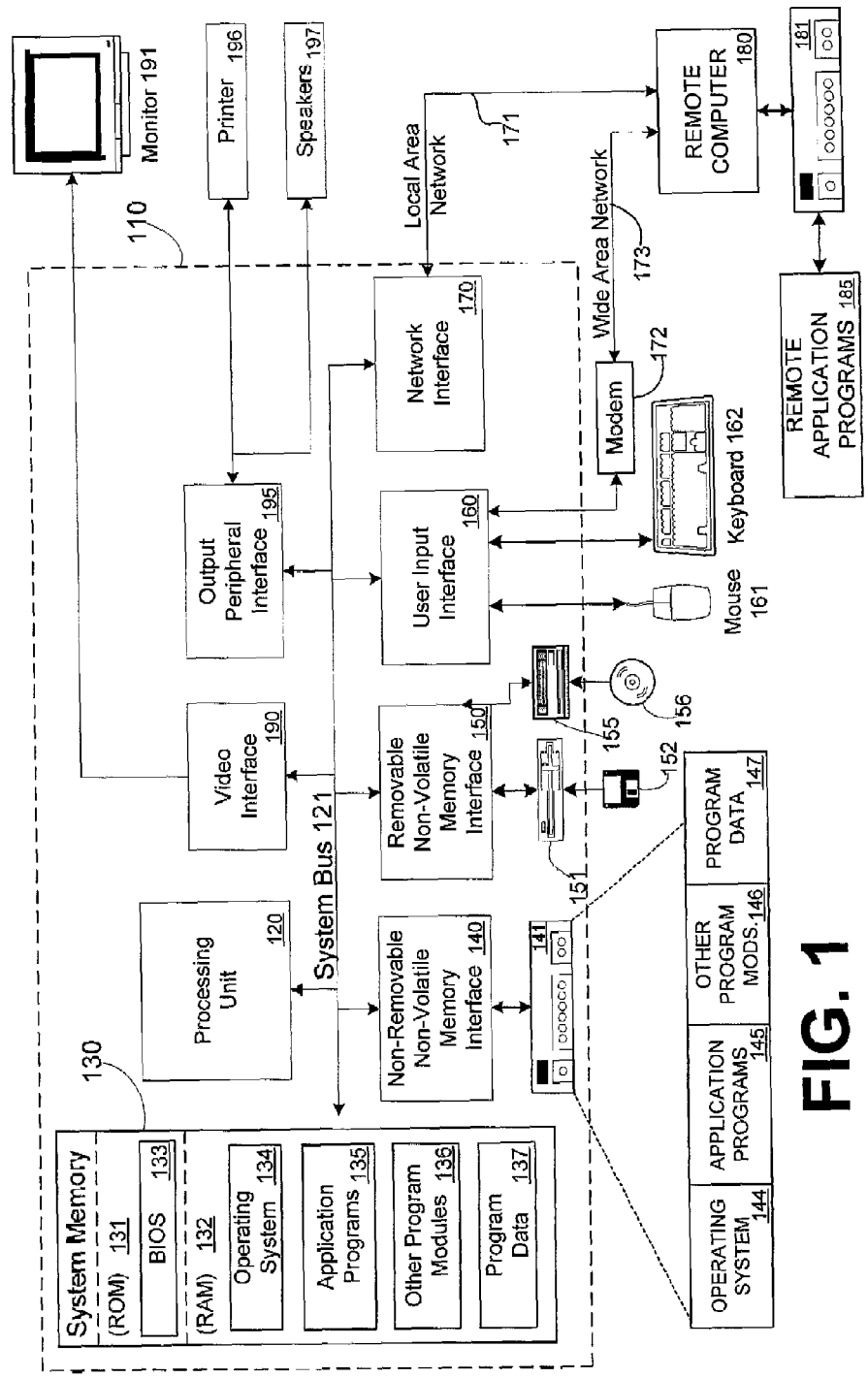
FIG. 1 is a block diagram representing a suitable computing system environment in which the present invention may be implemented.

FIG. 1 and the following discussion are intended to provide a brief general description of a suitable computing environment in which the invention may be implemented. Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
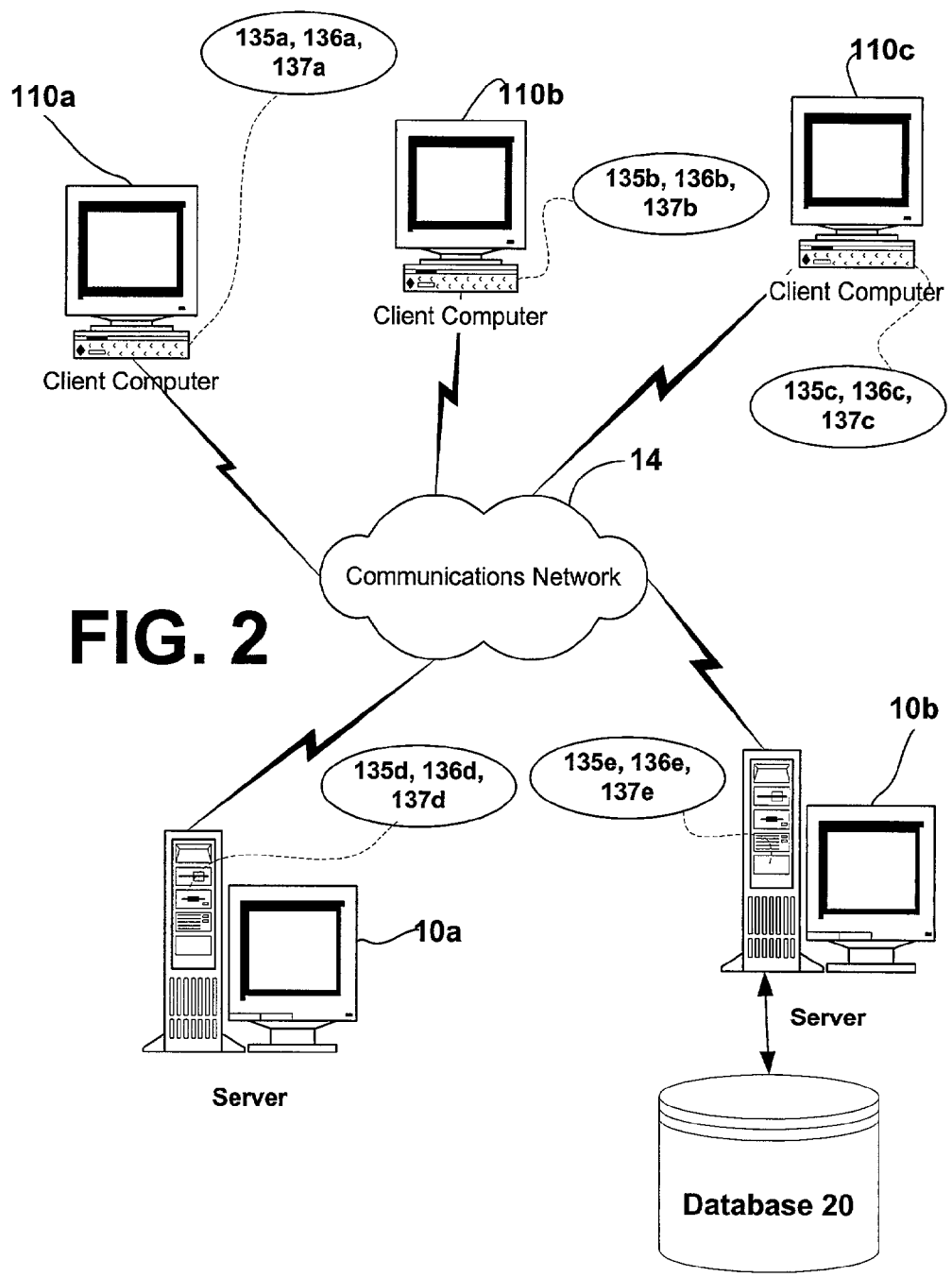
FIG. 2 is a block diagram representing an exemplary network environment in which the present invention may be implemented.

As mentioned, a computer 110, such as described above, can be deployed as part of a computer network. Further, the present invention pertains to any computer system having any number of memory or storage units, and any number of applications and processes occurring across any number of storage units or volumes. Thus, the present invention may apply to both server computers and client computers deployed in a network environment, having remote or local storage. FIG. 2 illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 110a, 110b, 110c, etc. In a network environment in which the communications network 14 is the Internet, for example, the servers 10 can be Web servers with which the clients 110a, 110b, etc. communicate via any of a number of known protocols such as hypertext transfer protocol (HTTP). Each client computer 110 and server computer 10 may be equipped with various application program modules 135, other program modules 136 and program data 137, and with connections or access to various types of storage elements or objects, across which files may be stored or to which portion(s) of files may be downloaded or migrated. Any server 10a, 10b, etc. may be responsible for the maintenance and updating of a database 20 in accordance with the present invention. Thus, the present invention can be utilized in a computer network environment having client computers 110a, 110b, etc. for accessing and interacting with a computer network and server computers 10a, 10b, etc. for interacting with client computers 110a, 110b, etc. and databases 20.

Static Maximum Allowed Access

As alluded to in the background, the problem addressed by the cached static maximum allowed access mechanism of the present invention is the problem of costly redundant access evaluations. Some resource managers, i.e., applications that create and manage objects and resources and access control lists (ACLs) for access to those objects and resources, support high level operations that may access large numbers of objects, perhaps multiple times each, on behalf of the caller of the operation. Systems with large numbers of objects often associate the same ACL or identical copies of an ACL with multiple objects as a means of providing scalable administrative ease-of-use. Because a single access check, which compares a caller's client context with an ACL, is a fairly costly evaluation, the performance cost of large numbers of access checks for a single high-level operation can be undesirably large. By improving the performance of redundant access checks (access checks in which the caller's client context and the ACL remain the same, although the required access permissions may be different), these systems may be able to improve the performance of high-level operations significantly.

The cached static maximum allowed access (SMAA) mechanism of the present invention provides a high performance access check routine for applications that perform redundant access checks. A redundant access check is an access check where the client context of the caller and the DACL used to control access are the same for multiple access check calls. The SMAA mechanism thereby provides system performance improvements since evaluation of DACLs for access control, particularly DACLs with run-time dynamic computations, can be costly. The caching and special access evaluation processing associated with this invention can provide enormous performance gains to applications that do redundant access checks. For example, the granting or denying of access to a document may have an access routine associated therewith. Since most access attempts involve the same or similar client context, the same DACL is evaluated, e.g., a DACL associated with accessing the document. Consequently, an authorization handle may be assigned to the first request, the results of the access check can be cached in a SMAA structure, and subsequently, similar requests may be satisfied, at least in part, from the results contained in the SMAA data structure associated with the authorization handle.

The SMAA mechanism of the present invention also provides support for varying desired access permissions and dynamic access policy. Although the caller's client context and the DACL must remain the same for multiple high-performance access checks using this mechanism, each access check supports unique input values for (a) desired access i.e., the set of permissions required to perform a certain operation on an object protected by the DACL and (b) dynamic factors i.e., dynamic data that may vary between access check calls and is required to evaluate the dynamic portions of access policy associated with the DACL.

A typical calculation and caching of the static maximum allowed access includes the following. If no dynamic access policy is defined in the DACL, then access decisions are nearly instantaneous since the static maximum allowed access contains all permissions that may be granted to the caller. Even if some dynamic access policy is defined in the DACL, access decisions are generally faster than normal since the static and/or dynamic access policy may not need to be reevaluated.

A request for permissions contained entirely within the set of static maximum allowed access does not require additional dynamic access evaluation. Sometimes, however, an evaluation of access policy for a given request may nonetheless involve an evaluation of dynamic access policy. Advantageously for most of these cases, only the dynamic elements of the access policy (and not the entire DACL) are reevaluated to complete the access decision evaluation process.

The cached static maximum allowed access mechanism of the present invention thus provides a solution to the problem of costly redundant access checks by supporting the generation of static maximum allowed access data. A resource manager may, during a normal access check call, request that the access decision information for a given caller and ACL be cached for use on a subsequent access check call for the same or similar caller and ACL. The goal is to store the maximum allowed access permissions for a given client context and ACL so that subsequent requests for certain permissions may be checked against the maximum allowed set without re-evaluating the ACL. Because an ACL may contain both static ACEs (where the applicability of the ACE to the caller does not depend on any information not stored in the ACE) and dynamic ACEs (where the applicability of the ACE to the caller depends on dynamic information not present in the ACE), it is not always possible to determine a maximum allowed access that is valid for all possible access checks. The presence of dynamic ACEs may force a full or partial re-evaluation of the ACL. Thus, in any event, a maximum set of permissions that are granted to a caller regardless of the applicability of dynamic ACEs can be calculated and cached as the static maximum allowed access.

The static maximum allowed access mechanism of the present invention also enables fast access check operation using cached information. After the first access check call for a given client context and ACL, a resource manager may request a higher performance access check using the cached access information generated by the first access check call by referencing the authorization handle assigned to the static maximum allowed access information. The fast access check then determines if the requested permissions are all contained in the cached static maximum allowed access information. If so, then the access check is complete because the data may be compared and evaluated on a static basis. If not, then some dynamic elements of the ACL may need to be evaluated to complete the access check.

In one embodiment, the cached static maximum allowed access mechanism of the present invention supports generation of static maximum allowed access information and fast access check operations using the cached information with the following exemplary structures and mechanisms. Two types of ACEs require dynamic information to be provided at access check time to complete the evaluation of whether the ACE is applicable to the caller: principal self ACEs and dynamic callback ACEs. The applicability of ACEs containing the principal self security identifier (SID) depends on the value of the principal self SID field in the access request structure that is passed into the access check call. The caller of or client associated with the access check routine determines the principal self SID associated with the object being accessed. If the input principal self SID matches a SID in the caller's client context, then the ACE is considered applicable to this caller.

The applicability of a dynamic callback ACE is determined by two applicability checks: the SID check and the callback check. First, a determination is made with the SID check as to whether the SID in the callback ACE matches one of the SIDs in the caller's client context. If a match is found, a dynamic access check callback routine is invoked. The dynamic access check callback routine, implemented by an application and registered during the initialization of the Resource Manager, determines whether the callback ACE is applicable to the caller. Dynamic data may be provided (in optional arguments field of the access request structure passed to access check routines) by the application for evaluation of the applicability of the callback ACE to the caller's request. In this regard, the access request structure contains information that a calling application supplies for use during access check. Fields include desired access i.e., the set of permissions required to perform the requested operation against the current object, the principal self SID (primarily applicable for access to User objects) i.e., the security identifier associated with a User object being accessed, optional arguments i.e., optional data to be passed to the Dynamic Access Check callback routine when a Callback ACE matches a caller during ACL evaluation.

The principal self SID field and optional arguments field are dynamic data that affect the applicability of the dynamic ACEs. As mentioned, the present invention caches access decision information and assigns an authorization handle to the information. The authorization handle structure contains the following information, cached for use with subsequent redundant access checks: a reference to the client context associated with the caller's request, a security descriptor and the static maximum allowed access. The security descriptor is the structure containing the DACL. The static maximum allowed access is the set of permissions reflecting the maximum allowed access that will always be granted to this caller by this DACL, regardless of the outcome of dynamic elements of the access check. This set reflects permissions from the following types of ACEs: (1) Static Grant and Deny ACEs that apply to the caller (i.e., the SID in the ACE matches a SID in the client context) and (2) dynamic deny ACEs with potential applicability to the caller. Dynamic deny ACEs with potential applicability to the caller include (a) principal self deny ACEs and (b) callback deny ACEs with SIDs that match the caller.

It should be noted that an attempt is not made to determine the applicability of the dynamic deny ACEs to the caller, since the applicability could change on subsequent access checks. With the present invention, for the purposes of determining static maximum allowed access, a pessimistic outcome is assumed so permissions denied in these ACEs are withheld from static maximum allowed access.

In one embodiment of the invention, the authorization handle is created at the caller's request in the access check routine and is returned from the access check routine in an authorization handle parameter.

Figure 3:
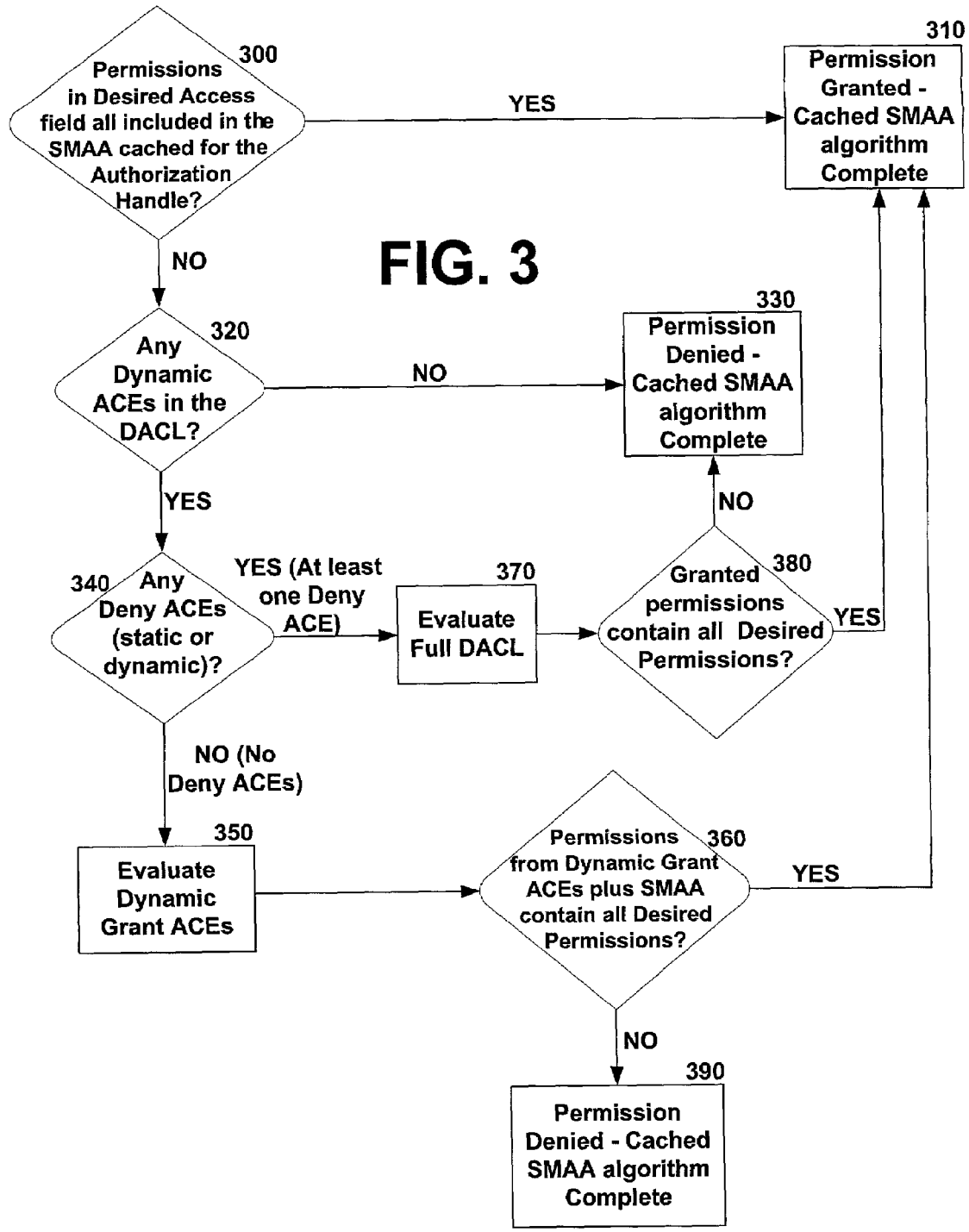
FIG. 3 illustrates an exemplary cached static maximum allowed access check procedure in accordance with the present invention.

A cached access check routine performs an access check for the caller and DACL associated with the input authorization handle. A typical flow of the cached access check routine is illustrated in FIG. 3. At 300, a determination is made as to whether the permissions in the desired access field are all included in the static maximum allowed access cached in the associated authorization handle. If so, then at 310, access is granted and the algorithm is complete. Otherwise, at 320, a determination is made as to whether there are any dynamic ACEs in the DACL. If there are none, then at 330 access is denied and the algorithm completes. Otherwise, at 340, a determination is made as to whether the DACL contains deny ACEs of any kind (static or dynamic). If there are no deny ACEs, then only the dynamic grant ACEs are evaluated at 350. At 360, if the permissions granted by the dynamic grant ACEs (at 350) and the static maximum allowed access together include all permissions in the desired access field, then access is granted at 310 and the algorithm is complete. Otherwise, access is denied at 390 and the algorithm is complete.

If, however, the determination of 340 yields that there is at least one deny ACE (either static or dynamic), then it is determined that there is at least one deny ACE and at least one dynamic ACE since there must be at least one dynamic ACE to reach 340. In these circumstances, according to this implementation, then a full DACL evaluation, ignoring the cached SMAA, is performed at 370 to determine if access is granted. It is necessary to reevaluate the DACL in its entirety because the outcome of the access check depends on the order of the deny ACEs and the dynamic ACEs with respect to the remaining static ACEs used to generate the SMAA. At 380, if the permissions granted as a result of the full DACL evaluation (at 370) contain all the permissions in the desired access field, then access is granted at 310. Otherwise, access is denied at 330.

Since generally it may be determined with reasonable certainty whether a DACL contains sufficient static policy information, and whether typical access determinations involve this static policy, to warrant use of the cached access check routine, this algorithm will rarely reach 370. Even if a full DACL evaluation is performed at 370, the savings gained for other determinations that do not reach 370 will generally outweigh the inefficiency of extra steps implicated in connection with executing 370. In any event, for most access checks that are repeated, substantial efficiency gains and performance improvements are achieved, even in the presence of some dynamic authorization policy, which is unsuitable for optimization by caching, by the present invention.

Figure 4:
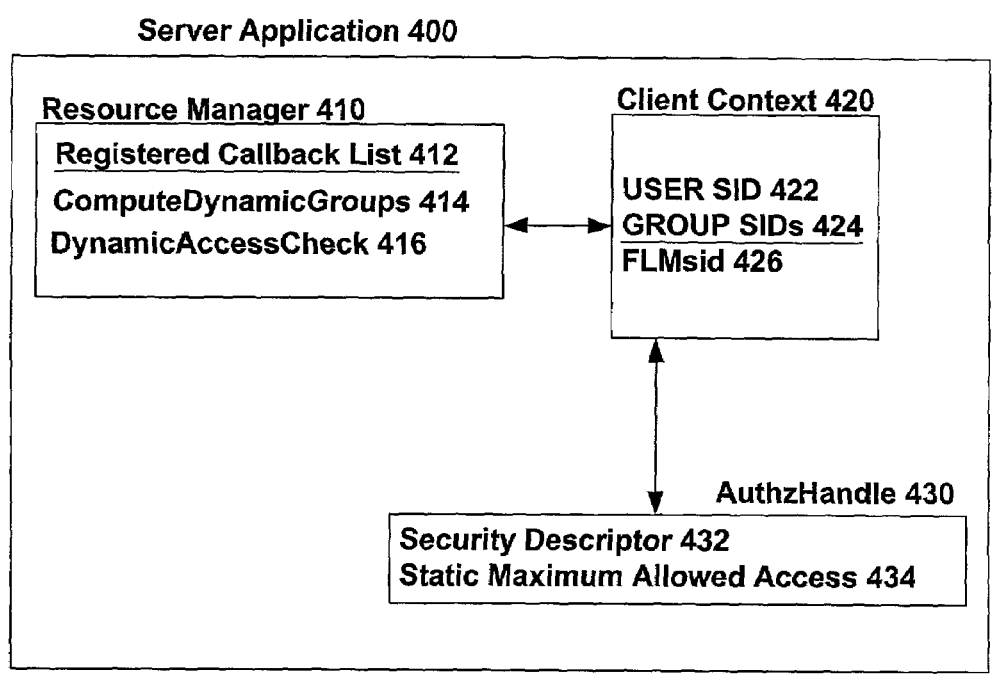
FIG. 4 is a block diagram of an exemplary architecture used in connection with the provision of a static maximum allowed access mechanism in connection with a dynamic authorization service in accordance with the present invention.

FIG. 4 illustrates an exemplary authorization framework in accordance with an exemplary system that can perform dynamic access checks, and has functionality of the static maximum allowed access of the present invention implemented therein. The exemplary authorization framework architecture includes three main components: (1) a resource manager 410, (2) the client context 420 and (3) an authorization handle 430.

A resource manager is a generic object that manages and controls resources in a computer system. The resource manager 410 stores references to application-defined callback functions, and creates a client context 420 for each incoming client to the application 400 i.e., the resource manager 410 represents clients trying to access resource(s). The resource manager may choose to establish an authorization handle 430 upon the first access check for a given pair of client context and security descriptor 432. The resource manager stores references to application-defined dynamic callback functions, including a compute dynamic groups mechanism 414 and a dynamic access check callback mechanism 416.

The client context 420 contains the user identifiers 422 and group identifiers 424 and is used within access check functions to determine which DACL entries, that is, which ACEs, are applicable to the client making the request. An example of a SID that may be associated with the client context 420 might be Manager_sid 426 to indicate that the user of the client is a manager of a bank.

Among other data, the authorization handle 430 represents a security descriptor 432, a data structure that holds the DACL. The authorization handle 430 also contains a reference to the client context 420 in order to relate the client's request for resources to the resource manager 410. In accordance with the present invention, as a part of the first access request for a given DACL and given client context 420, an authorization handle 430 may be created, and static maximum allowed access information 434 may also be associated with it if it is likely that savings will result from the caching of such SMAA information 434.

The architecture of the invention has thus far been described to assume an application model where an application 400 has a resource manager 410 that performs resource management functions for the application 400. For example, the resource manager 410 manages objects and resources that are protected by DACLs composed of ACEs. The resource manager 410 manages resources i.e., it controls the creation, storage, and manipulation of some object or resource type. The resource manager manages authorization information i.e., it controls the storage and manipulation of authorization information, which defines the access policy for the managed resources, wherein such access policy may be expressed in the form of a security descriptor 432 containing a DACL that may contain static ACEs and/or dynamic ACEs. It should also be understood that, advantageously, the invention may be implemented on top of or as a supplement to other existing static or dynamic authorization frameworks and procedures as well.

Figure 5:
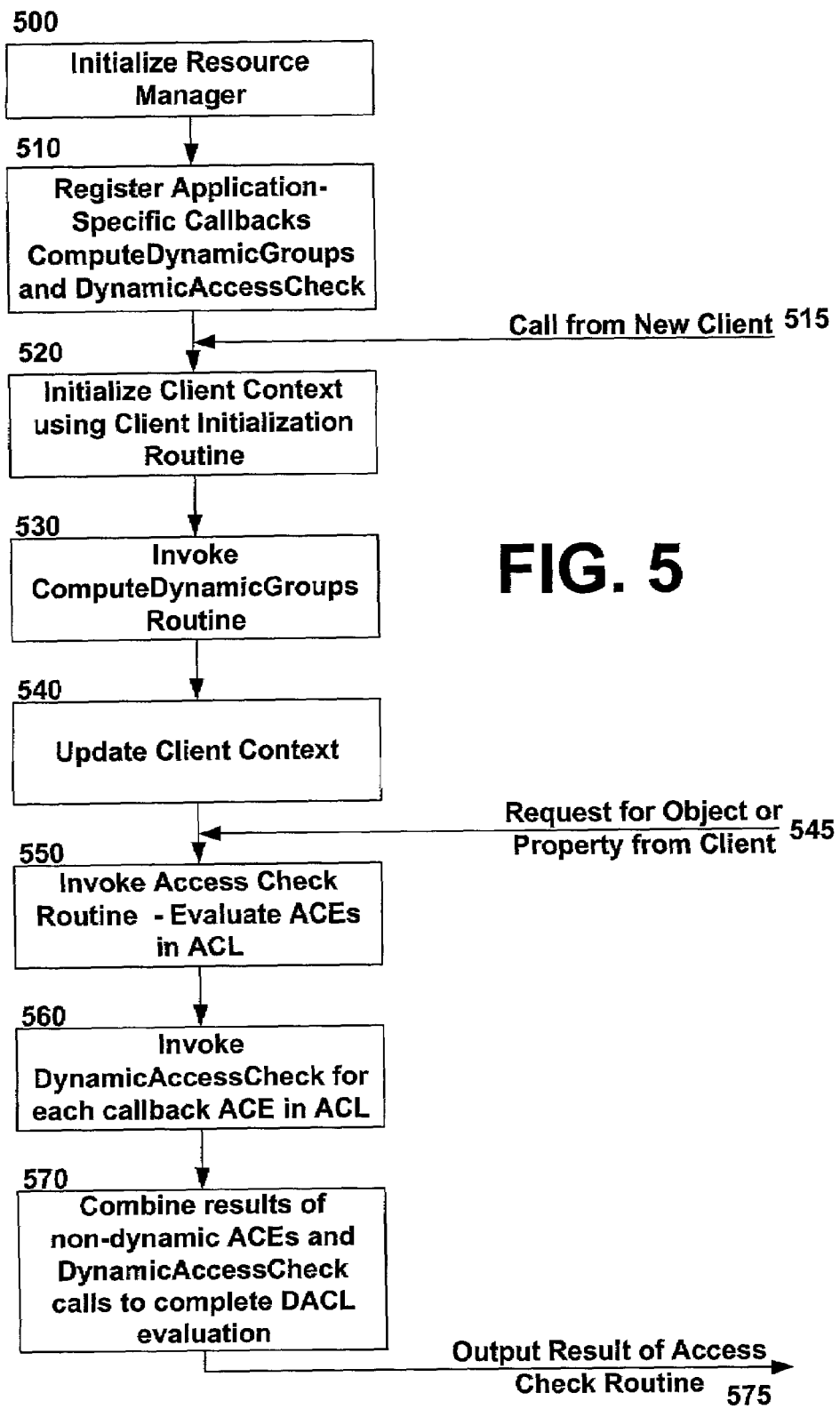
FIG. 5 is a flow diagram illustrating an exemplary sequence of events for a dynamic authorization service in connection with which the static maximum allowed access mechanism of the present invention may be implemented.

For example, an exemplary dynamic authorization policy mechanism in accordance with the architecture of FIG. 4 is illustrated in the flow diagram of FIG. 5. At start up of application 400, at 500, the application initializes a resource manager 410 and at 510, registers with the resource manager 410 a compute dynamic groups 414 callback function and a dynamic access check 416 callback function using an initialization routine. Next, at 515, when a client request for an object or property is received, at 520, the application 400 initializes a client context 420 for that client using a client context initialization routine. If the application possesses information such as system data, environment data, additional client attributes or client parameter values passed in from the client operation that must be evaluated to determine whether the client should be made a member of dynamic groups, the application passes this dynamic data into the client context initialization routine(s).

Within the client context initialization routine performed at 520, the resource manager 410 first populates the client context 420 with the user identifier 422 and group identifiers 424 associated with the security context passed into the routine. Then, at 530, the resource manager 410 invokes the compute dynamic groups callback function 414, if present, passing the relevant dynamic data from the client context initialization routine into one or more argument parameters. Based on this evaluation, the compute dynamic groups callback function 414 may identify, and return, one or more dynamic groups to which the client should be assigned. At 540, these dynamic groups are then added to the list of user and group identifiers in the client context 420.

Then, for an access check, at 550, the application 400 calls a standard access check routine to determine if the caller or client represented by the input client context 420 is allowed access to the object or property protected by the input security descriptor 432 containing the DACL. If dynamic data, such as runtime or operational data, is required for the access check, the application passes this data in an optional arguments field of an access check data structure passed into the access check routine. If the DACL in the input security descriptor 432 contains a callback ACE with a security identifier that matches an identifier in the client context 420, then, for each such callback ACE, the application-defined dynamic access check callback function 416, if present, is invoked at 560 with inputs including the client context 420, the optional arguments passed into the standard access check routine, and the matching callback ACE, which may itself contain some authorization policy data meaningful only to the application-defined dynamic access check callback function.

When the DACL evaluation of 570 is complete, perhaps after one or more invocations of the dynamic access check function 416, the standard access check function outputs the result at 575. Thus, through the vehicle of a system with a dynamic access check routine 416, access policy may be defined and assessed in terms of dynamic policy and data. As with any dynamic access policy, however, these computations may be resource intensive.

Figure 6:
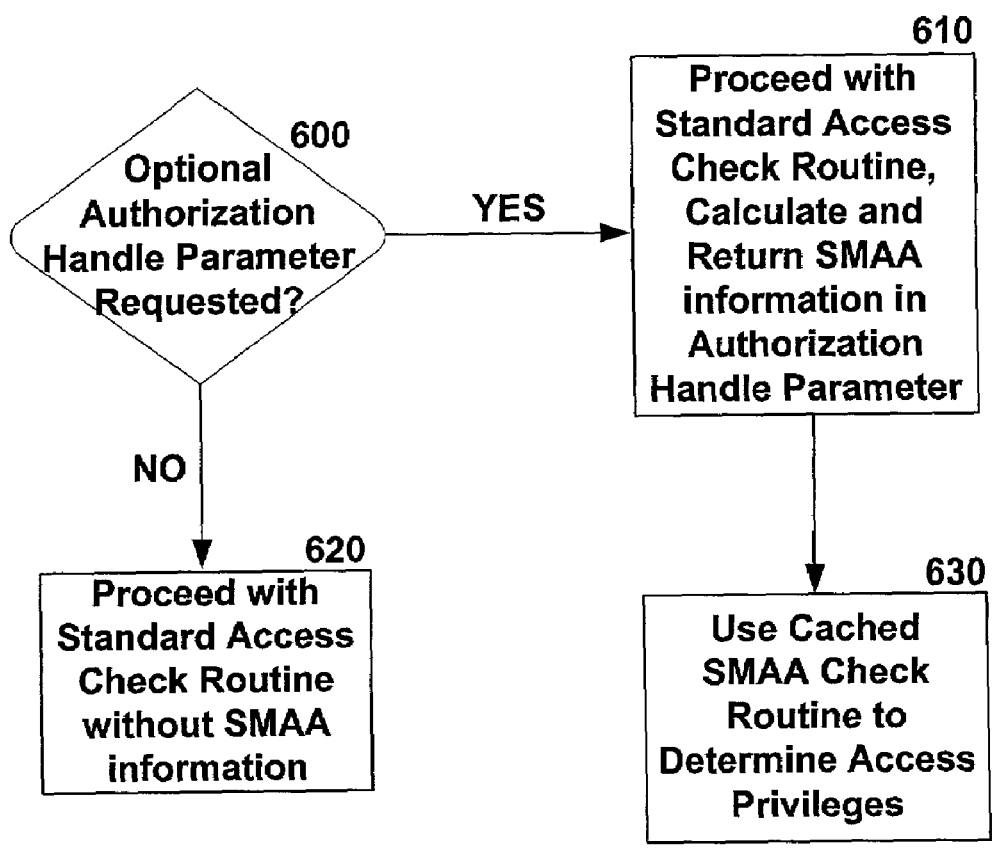
FIG. 6 illustrates an implementation of the static maximum allowed access mechanism of the present invention, wherein results output for an initial access check procedure, may be cached for use in connection with efficient future access checks.

FIG. 6 illustrates an implementation of the static maximum allowed access mechanism of the present invention, wherein the results output at 575 for an initial access check procedure, at 550, may be cached for use in connection with future access checks.

If, at 600, the access check process is not called with the optional authorization handle parameter, then the standard access check routine proceeds as usual at 620. If, at 600, the access check process was called with the optional authorization handle parameter so as to calculate and return information for the static maximum allowed access 434, then the information required to persist the access decision result output at 575 is stored in a return value of authorization handle parameter at 610. As a consequence, at 630, the static maximum allowed access 434 may then be used in subsequent calls to a cached access check procedure, for example, as described in connection with FIG. 3. As explained above, these subsequent calls are efficient because the client context 420 and the security descriptor 432 used for access check are the same as those used in the access check call of 550 used to generate the authorization handle 430.

Then, if the application 400 receives a request for another access check for a given client context 420, perhaps for the same object or resource as a previous access check, or for another object with an identical security descriptor 432, the application may gain a performance advantage by using the cached access decision information 434 associated with the authorization handle 430 generated from the previous call to the access check routine having the same client context 420 and security descriptor 432. In this case, the application calls the cached access check routine, at 630, passing in the authorization handle 430 returned in the authorization handle parameter of the previous call to the access check procedure of 550. Futhermore, advantageously, a set of requested access rights and application-defined authorization policy information different from the previous call may be requested with an access request input field of the dynamic cached access check routine. Thus, a static maximum allowed access is cached in accordance with the present invention to provide efficiencies inherent in access check procedures for multiple redundant or similar access requests.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of DACLs containing ACE data structures, the present invention applies to any system in which access procedures are defined by way of static or dynamically computed data. One skilled in the art will recognize that the present invention is not limited to the flow diagram of FIG. 3, but rather the caching of a static maximum allowed access is applicable to any computer system and different implementations will generally be tailored to the nomenclature utilized by different access check procedures. Furthermore, it should be emphasized that a variety of computer platforms beyond the personal computer, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for enforcing static and dynamic access policy protecting a resource in a computer system, the system having a client thereof making a first access request for the resource, the method comprising:
   determining a static maximum allowed access data structure pursuant to an evaluation of the first access request, wherein the static maximum allowed access data structure includes information representative of a set of policies that is reduced to static form that is common to a class of access requests;
   storing the static maximum allowed access data structure;
   in response to a determination that the static maximum allowed access data structure is applicable to a second access request, utilizing said static maximum allowed access data structure in connection with the requested permission set of the second access request; and
   evaluating whether there is at least one dynamic access control entry in a discretionary access control list associated with the second access request.

2. A method according to claim 1, wherein the storing of the static maximum allowed access data structure includes storing the static maximum allowed access data structure in cache memory.

3. A method according to claim 1, further comprising computing a client security context after the first access request for the resource is received from the client.

4. A method according to claim 1, further comprising determining whether said second access request is granted based at least in part on dynamic data and dynamic policy algorithms.

5. A method according to claim 1, further comprising:
   evaluating whether the requested permission set of the second access request is represented within the static maximum allowed access data structure.

6. A method according to claim 1, wherein an application programming interface utilizes said static maximum allowed access data structure in connection with the evaluation of the requested permission set of the second access request.

7. A method according to claim 1, further comprising:
   evaluating whether the requested permission set of the second access request is contained within said static maximum allowed access data structure.

8. A method according to claim 1, further comprising:
   evaluating whether at least one access control entry in a discretionary access control list associated with the second access request is a deny access control entry.

9. A method according to claim 8, wherein if there is not at least one deny access control entry, the method further comprises:
   evaluating whether the requested permission set of the second access request is encompassed by (1) permissions obtained by evaluating at least one dynamic grant access control entry and (2) permissions contained said static maximum allowed access data structure.

10. A method according to claim 1, wherein said determining of a static maximum allowed access data structure pursuant to an evaluation of the first access request supplements a standard determination of access rights based upon static and dynamic policy data and policy evaluation algorithms.

11. A computer readable medium having computer executable instructions for carrying out the method of claim 1.

12. A modulated data signal carrying computer executable instructions for performing the method of claim 1.

13. A computer readable medium bearing computer executable instruction for carrying out a static maximum allowed access mechanism for an application in a computer system having a resource manager that manages and controls access to a resource, wherein the static maximum allowed access mechanism provides extensible support for application-defined business rules via a set of APIs and DACLs, wherein a static maximum allowed access data structure is determined pursuant to an evaluation of a first access request; and wherein data of said static maximum allowed access data structure is utilized in connection with a second access request.

14. A computer readable medium bearing computer executable instruction for carrying out a static maximum allowed access mechanism according to claim 13, wherein the storing of the static maximum allowed access data structure includes storing the static maximum allowed access data structure in cache memory.

15. A computer readable medium bearing computer executable instruction for carrying out a static maximum allowed access mechanism according to claim 13, wherein a client security context is computed after the first access request for the resource is received from the client and the determination as to whether said access request is granted is dynamic.

16. A computer readable medium bearing computer executable instruction for carrying out a static maximum allowed access mechanism according to claim 13, wherein the utilization of data of the static maximum allowed access data structure in connection with a requested permission set of a second access request includes an evaluation of whether the requested permission set of the second access request is represented within the static maximum allowed access data structure.

17. A system comprising:
   a discretionary access control list;
   a static maximum allowed access data structure stored on a computer readable medium for use in connection with access check determinations for an application in a computer system, the data structure comprising:
      an identifier identifying the data structure as a static maximum allowed access data structure, wherein at least one property of said static maximum allowed access data structure is determined by an evaluation of an access request; and
      data representing the static maximum allowed access for a given security descriptor and a corresponding client context in connection with an access request; and
   a software component for evaluating whether there is at least one dynamic access control entry in said discretionary access control list, wherein if said software component discovers a dynamic access control entry, both the static maximum allowed access data structure and the dynamic access control entry are utilized in a corresponding access check determination.

18. A system according to claim 17, wherein the static maximum allowed access data structure is stored in cache memory.

19. A system according to claim 17, wherein the static maximum allowed access data structure includes a security descriptor.

20. A system according to claim 17, wherein the static maximum allowed access data structure includes one of data representing the client context and a pointer to the client context.

* * * * *